United States Patent [19]

Plamper

[11] Patent Number: 5,113,717
[45] Date of Patent: May 19, 1992

[54] MOTION TRANSMITTING REMOTE CONTROL ASSEMBLY WITH A CONDUIT LOCATOR CONNECTING MEANS

[75] Inventor: Gerhard R. Plamper, Birmingham, Mich.

[73] Assignee: Teleflex Incorporated, Limerick, Pa.

[21] Appl. No.: 648,126

[22] Filed: Jan. 30, 1991

[51] Int. Cl.⁵ .................. F16L 3/00; F16C 1/26
[52] U.S. Cl. .................. 74/502.6; 74/502.4; 248/68.1; 248/74.1
[58] Field of Search ............ 248/71, 74.1, 68.1; 74/502.4, 502.6, 551.8

[56] References Cited

U.S. PATENT DOCUMENTS

| | | | |
|---|---|---|---|
| 2,937,834 | 2/1959 | Orenick et al. | 248/71 |
| 3,263,948 | 8/1966 | Conrad | 248/74 |
| 3,954,238 | 5/1976 | Nivet | 248/68.1 |
| 3,995,512 | 12/1976 | Johnsen | 74/501 R |
| 4,011,770 | 3/1977 | Webb | 74/502.4 |
| 4,564,163 | 1/1986 | Barnett | 248/71 |
| 4,669,688 | 6/1987 | Itoh et al. | 248/71 X |
| 4,958,791 | 9/1990 | Nakamura | 248/68.1 X |
| 5,039,040 | 8/1991 | Idjakiren | 248/71 |
| 5,040,752 | 8/1991 | Morrison | 248/7 |
| 5,060,810 | 10/1991 | Jones | 248/68.1 X |

FOREIGN PATENT DOCUMENTS

| | | | |
|---|---|---|---|
| 857606 | 12/1970 | Canada | 74/502.4 |
| 2200706 | 8/1988 | United Kingdom | 74/502.4 |

*Primary Examiner*—Rodney H. Bonck
*Assistant Examiner*—Khoi Q. Ta
*Attorney, Agent, or Firm*—Reising, Ethington, Barnard, Perry & Milton

[57] ABSTRACT

A motion transmitting remote control assembly (10) of the type for transmitting motion in a curved path by a motion transmitting core element comprising a conduit (12) for establishing a path for a core element (17). The assembly (10) further comprises connections (18) slideably coupled about the conduit (12) and connecting the conduit (12) to a support structure (20). The assembly (10) includes stop blocks (25, 26) fixedly secured to the conduit (12) at predetermined axially spaced positions and on adjacent opposite sides of the connections (18) to limit the axial movement of the connections (18) along the conduit (12).

25 Claims, 6 Drawing Sheets

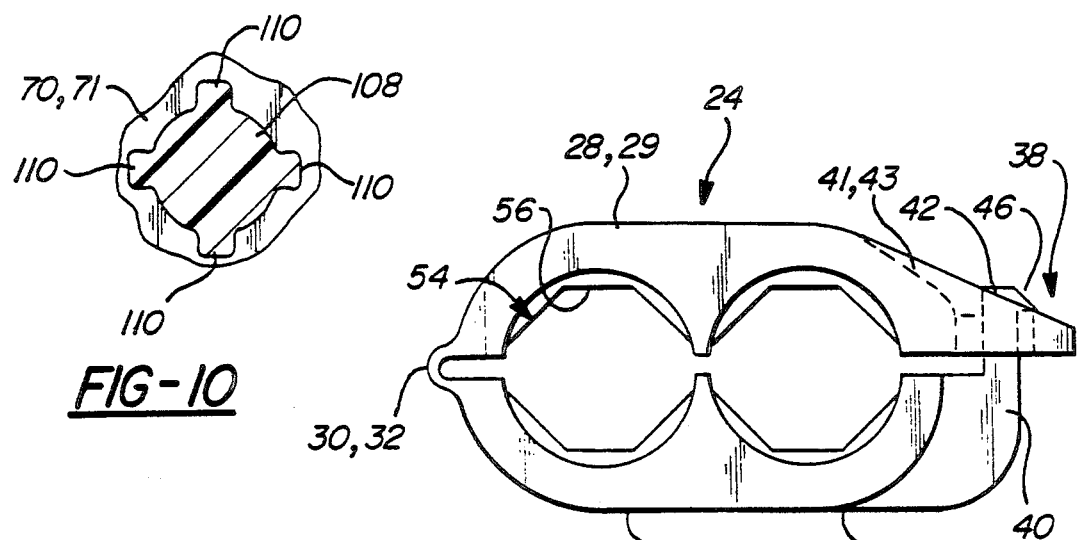
FIG-10
FIG-14
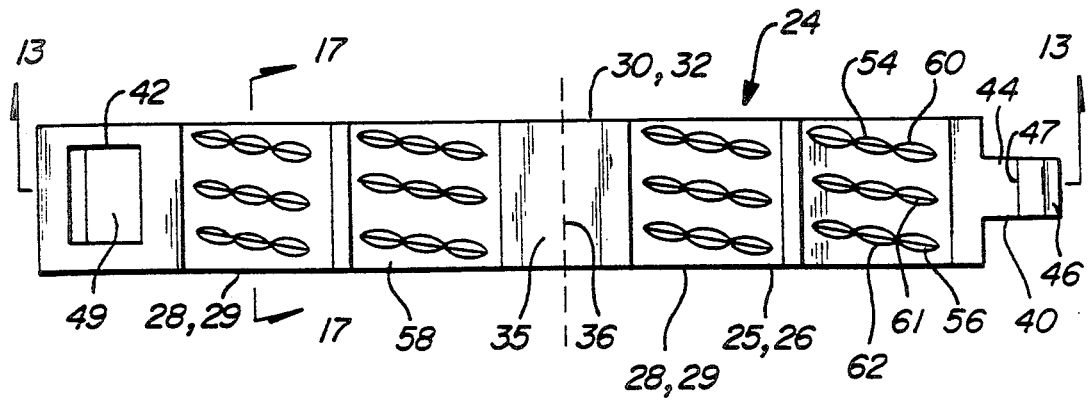
FIG-11
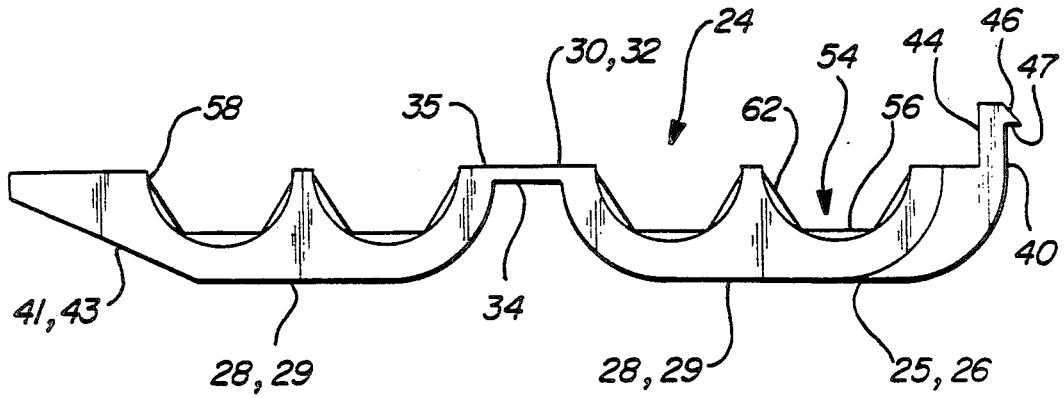
FIG-12

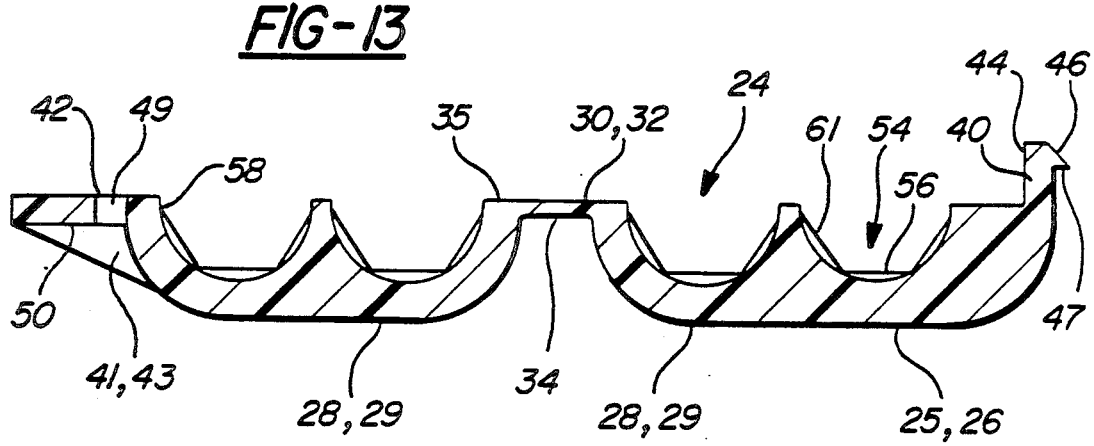
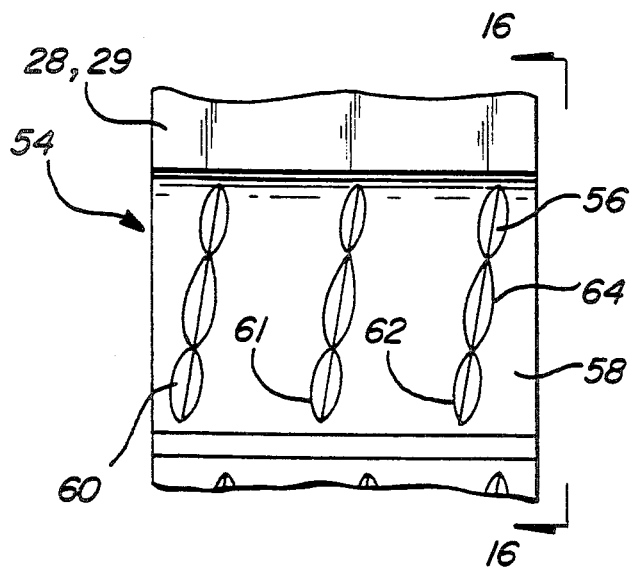
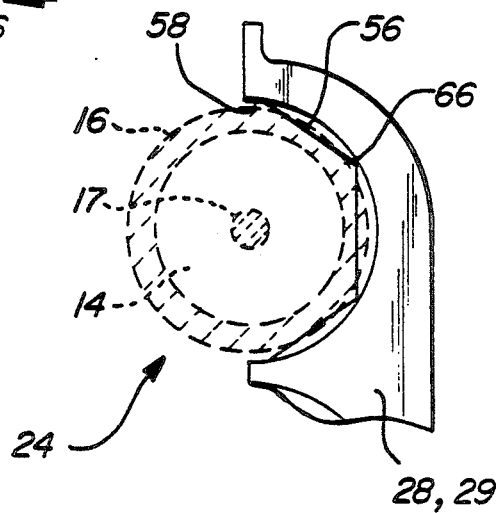

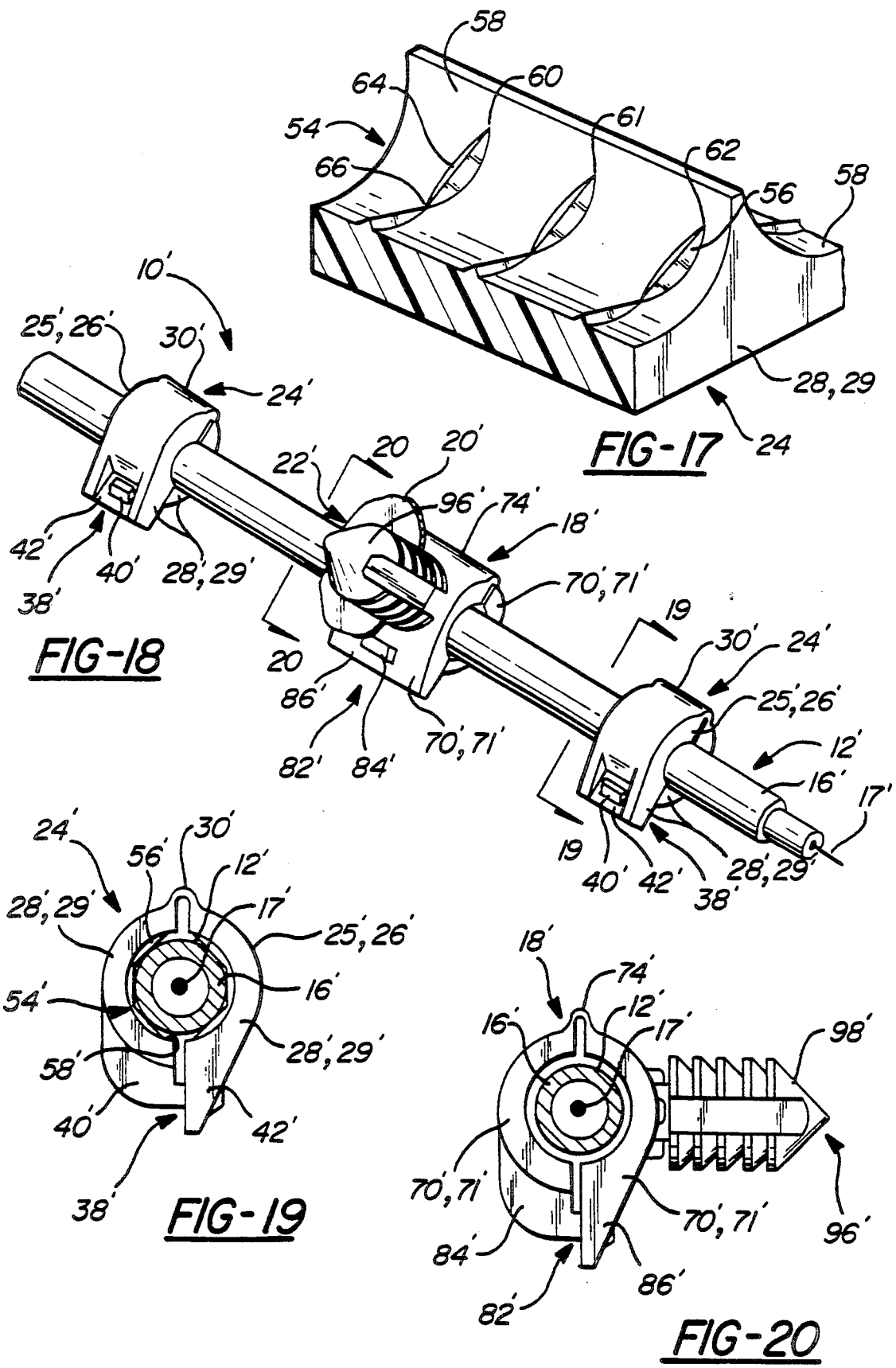

MOTION TRANSMITTING REMOTE CONTROL ASSEMBLY WITH A CONDUIT LOCATOR CONNECTING MEANS

TECHNICAL FIELD

The subject invention relates generally to motion transmitting remote control assemblies, and more specifically, to means for securing the assemblies to a support structure.

BACKGROUND ART

Conduit fasteners, referred to herein as conduit locator connecting means are vastly known and used in the art of remote control assemblies. In general, a first end of a core element within a conduit is attached to an actuator and the second end connected to a controller, such as the connection between a clutch and clutch pedal of an automobile. Intermediate of the actuator and connector, the core element and conduit, or control assembly, needs to be secured to a housing or support structure within the vehicle. Various methods have been incorporated to provide a connecting means between the assembly and the support structure.

Commonly used in the art are connecting means which are fixedly secured at predetermined positions along a conduit and corresponding in alignment with a support structure. However, problems arise with this type of connecting means due to tolerance errors between the alignment of the connecting means and a connecting site on the support structure. If the tolerance or alignment between the connecting means and the connecting site is inaccurate, the assembler will often force the connection into place by bending the conduit until the connecting means is received in the support structure. However, as will be appreciated, the bending of the conduit will also alter the length of the core element within the conduit, thus requiring adjustment of the actuator and/or controller.

Further known in the art are connecting means which are slideably coupled to the conduit. This type of connecting means allows the assembler to slide the connecting means along the length of the conduit after the actuator and controller ends of the core element have been connected. The connecting means may be connected to the support structure without having to alter the path of the conduit and thus, alleviating the need for readjustment of the core element length. However, a problem arises with this type of connecting means because the slideable connecting means often collect at one or both ends of the conduit, thus requiring difficult and tedious assembly of the control assembly to the support structure. The assembler is required to slide the connecting means along the entire length of the conduit and properly align each connecting means with its corresponding connecting site.

The U.S. Pat. No. 2,937,834 to Orenick et al, issued May 24, 1960, discloses a connecting means including a flexible strap having an anchoring element and a locking element at opposite ends thereof. In us, the strap may be flexed and looped around a conduit or plurality of conduits until the locking element is received and inserted within the anchoring element. The anchoring element is then pushed into a bore of a support structure and thus fixedly secures the conduit in position. It will be noted, that if the connecting means is looped about the conduit prior to connection to the support structure it will be free to slide along the entire length of the conduit, causing the assembler to individually align each of the connection means along the length of the conduit with its corresponding connecting site.

The U.S. Pat. No. 3,263,948 to Conrad, issued Aug. 2, 1966, discloses a connecting means which is fixedly secured to a conduit. The connecting means comprises a means for engaging a portion of the conduit and fixedly securing the connecting means to the conduit to prevent relative axial movement between the conduit and the connecting means. The connecting means further includes a flange having a hole therein for allowing connection to a support structure. Thus, it will be appreciated that any tolerance inaccuracies between the connecting means and the connecting site of the support structure will require forced positioning of the connecting means by the assembler and thus alter the length of the core element and require readjustment thereof.

The U.S. Pat. No. 3,995,512 to Johnson, issued Dec. 7, 1976, discloses a connecting means including a flat base having a fastener for connection to a support structure, and further including a pair of opposed arcuate arms interconnected at one end by an abutment means. The connecting means receives a conduit within the arcuate arms and one end of the conduit is abutted against the abutment means to prevent relative longitudinal movement of the conduit. Thus, the connecting means is in a relatively fixed position and any tolerance errors will result in the required need for core element adjustment.

It remains desirable to provide a connecting means which is not fixedly secured to the conduit while also being limited from slideable travel along the entire length of the conduit.

SUMMARY OF THE INVENTION AND ADVANTAGES

In accordance with the present invention, there is provided a motion transmitting remote control assembly of the type for transmitting motion in a curved path by a motion transmitting core element, the assembly comprising: conduit means for establishing a path, a core element moveably guided by the conduit for transmitting motion in the path, and connecting means slideably coupled to the conduit for axial movement of the connecting means along the conduit and for connecting the conduit to a support structure. The motion transmitting remote control assembly is characterized by including limiting means fixedly disposed on the conduit in axially spaced position on opposite sides of the connecting means for limiting the axial movement of the connecting means along the conduit.

Thus, the subject invention provides a connecting means which is slideable along a portion of the conduit thus, not creating an alternation in the length of the core element, due to tolerance inaccuracies, when connected to a support structure. Further, the subject invention provides a connecting means which has limited axial travel distance along the conduit thus, providing for facile assembly by the assembler and for keeping the connecting means within a limited region for alignment with the support structure.

FIGURE IN THE DRAWINGS

Other advantages of the present invention will be readily appreciated as the same becomes better understood by reference to the following detailed description when considered in connection with the accompanying drawings wherein:

FIG. 10 is a cross-sectional view taken substantially along line 10—10 of FIG. 9;

FIG. 11 is a top view of the limiting means of FIG. 1 in an open position;

FIG. 12 is a front view of the limiting means of FIG. 11;

FIG. 13 is a cross-sectional front view taken substantially along line 13—13 of FIG. 11;

FIG. 14 is a front view of the limiting means of FIG. 12 in a closed position;

FIG. 15 is an enlarged fragmentary view of the gripping means of FIG. 11;

FIG. 16 is a cross-sectional view taken substantially along line 16—16 of FIG. 15 with the gripping means about a conduit;

FIG. 17 is a fragmentary cross-sectional perspective view taken substantially along line 17—17 of FIG. 11;

FIG. 18 is a perspective view of an alternative embodiment made in accordance with the present invention;

FIG. 19 is a cross-sectional view taken substantially along line 19—19 of FIG. 18;

FIG. 20 is a cross-sectional view taken substantially along line 20—20 of FIG. 18;

DETAILED DESCRIPTION OF THE PREFERRED EMBODIMENT OF FIGS. 1-17

Referring to the Figures wherein like numerals indicate like or corresponding parts throughout the several views, a motion transmitting remote control assembly of the type for transmitting motion in a curved path by a motion transmitting core element is generally shown at 10 in the Figures.

Figure 1:
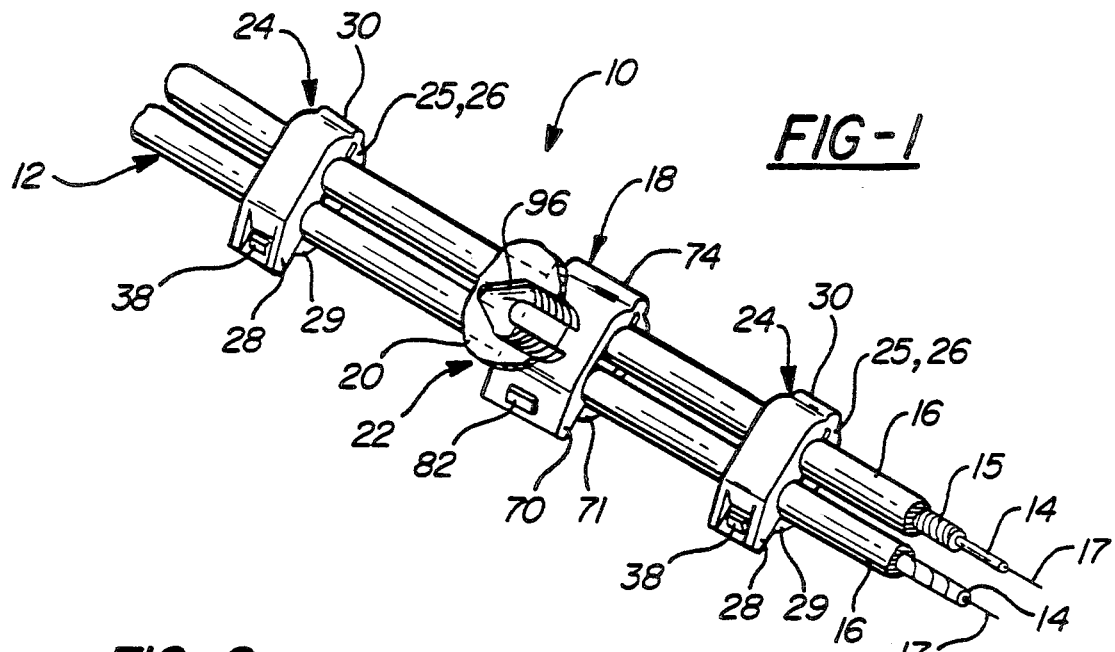
FIG. 1 is a perspective view of an assembly made in accordance with the present invention.

The assembly 10 includes conduit means 12 for establishing a path and a core element moveably guided by the conduit mean 12 for transmitting motion in the path. As shown in FIG. 1, the conduit means 12 may be of the type having an inner liner of organic polymeric material 14 and wrapped by an outer organic polymeric casing 16. The conduit means 12 may further be of the type having an inner liner of organic polymeric material 14 and wrapped by an outer organic polymeric casing 16. The conduit means 12 may further be of the type having an inner liner of organic polymeric material 14 surrounded by a helical wrapping of coiled metallic ribbon 15 having a predetermined width about which is diagonal to the inner liner 14 and further wrapped by the outer organic polymeric casing 16. A core element or cable 17 is guided within the inner liner 14 for transmitting motion along the path between an actuator and a controller.

The assembly 10 includes connecting means 18 slideably coupled to the conduit 12 for axial movement along the conduit 12 and for connecting the conduit 12 to a support structure 20. The conduit means 12 includes at least one connecting cite 22, as shown in FIG. 1, associated with the connecting means 18 and located intermediate opposite ends of the conduit means 12. Generally, a plurality of the connecting cites 22 and associated connecting means 18 are spaced a predetermined distance along the length of the conduit means 12 between the opposite ends for connection of the conduit 12 to the support structure 20.

The assembly 10 is characterized by including limiting means 24 fixedly disposed on the conduit 12 in axially spaced positioned on opposite sides of the connecting means 18 for limiting the axial movement of the connecting means 18 along the conduit 12. The limiting means 24 may further be defined by stop blocks 25, 26 disposed on the conduit means 12 adjacent to and on opposite sides of the connecting site 22 for locating and limiting the axial movement of the connecting means 18 substantially near the connecting cite 22. The stop blocks 25, 26 are fabricated of a rigid organic polymeric material and include a pair of conduit engaging members 28, 29. The stop blocks 25, 26 comprise hinging means 30 hinging the conduit engaging members 28, 29 together for movement relative to each other and to engage the conduit means 12 therebetween. As shown in FIGS. 12 and 13, the hinge means 30 is shown in a fully opened position with the conduit engaging members 28, 29 spread apart from each other and lying in a flat or horizontal plane. The limiting means 24 may be molded in this position forming a bell shaped portion 34 having a flat face 35. Upon coupling the limiting means 24 about the cable conduit 12, as shown in FIG. 14, a crease 36 is formed in the flat face 35 of the hinge means 30 allowing flexing of the rigid organic polymeric material.

The stop blocks 25, 26 further comprise latch means 38 for latching the conduit engaging members 28, 29 together and maintaining the members 28, 29 in engagement with the conduit means 12. The latch means 38 comprises a spring finger 40 extending from one of the conduit engaging members 28, 29 and a catch 42 disposed on the other conduit engaging member 28, 29 for cooperating with the spring finger 40 to latch the conduit engaging members 28, 29 together. The spring finger 40 includes an arm 44 extending outwardly from the conduit engaging member 28, 29 and having a camming surface 46 with a locking lip 47 thereon. The catch 42 includes an aperture 49, generally rectangular in shape, and a back wall 50. The catch 42 further includes support rails 41, 43, generally triangular in shape, on opposite sides of the aperture 49 to provide stability and rigidity about the catch 42 and aperture 49.

In latching, the arm 44 of the spring finger 40 is received within the aperture 49 upon closing the conduit engaging members 28, 29 together. The camming surface 46 guides the arm 44 through the aperture 49 until the lip 47 is received by the back wall 50 and abutted thereagainst. The aperture 49 is of larger dimensions than the spring finger arm 44, thus, to unlatch or disengage the latch means 38, the spring finger 40 is pressed inwardly until the lip 47 is released from the back wall 50 of the aperture 49 and the spring finger 40 may then be extended out of the catch 42.

The conduit engaging members 28, 29 further include gripping means 54 which deform and engage with the outer organic polymer casing 16 of the conduit means 12 and prevent relative axial movement between the conduit means 12 and the stop blocks 25, 26. As shown best in FIGS. 15-17, the gripping means 54 comprises a plurality of peaked projections 56 arranged in an angular or helical disposition about an inner surface 58 of the conduit engaging members 28, 29. The peaked projections 56 engage the conduit means 12 in an angular or helical arrangement and prevent axial movement of the conduit means 12 within the limiting means 24. The peaked projections 56 are elongated about the inner surface 58 to present a linear conduit gripping surface about the conduit means 12.

The peaked projections 56 are further arranged in rows 60, 61, 62, spaced axially apart a predetermined distance as shown best in FIG. 15. Each row 60, 61, 62 of peaked projections 56 is comprised of a plurality of arcuate wedges 64. As shown in FIG. 17, the wedges 64 have a generally pie-shaped cross section. The wedges 64 are integrally molded to the inner surface 58 of the conduit engaging members 28, 29 and interconnected at opposite ends forming an angled cavity 66 therebetween which allows the projections 56 to engage into the conduit means 12, as shown in FIG. 16.

Figure 5:
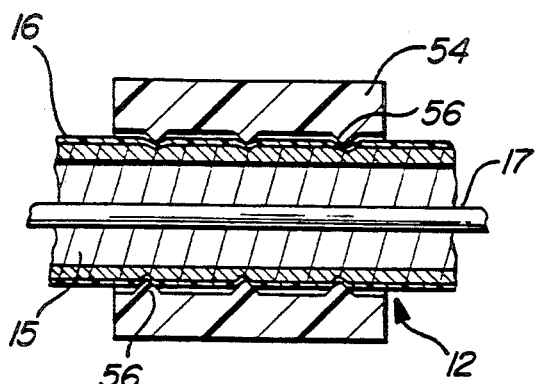
FIG. 5 is a cross-sectional view taken substantially along line 5—5 of FIG. 4 and orientated with its longitudinal axis in a horizontal plane.

The helical or angled configuration of the peaked projections 56 of the gripping means 54 enables the stop blocks 25, 26 to be adapted and connected to varying types of conduit means 12, as shown in FIG. 1. For example, as shown in FIG. 5, the helical arrangement of the peaked projections 56 readily corresponds with the type of conduit means 12 having a wrapping of coiled metallic ribbon 15 which is wrapped diagonally or helically about the inner organic polymeric liner 14. The spacing between the adjacent peaked projection rows 60, 61, 62 corresponds with the width of the coiled metallic ribbon 15 to enable the peaked projections 56 to grip the conduit means 12 between the adjacent wrappings of the coiled metallic ribbon 15. Furthermore, the peaked projections 56 are capable of gripping about any portion of the type of conduit means 12 having merely the inner liner 14 and outer polymeric casings 16.

Figure 2:
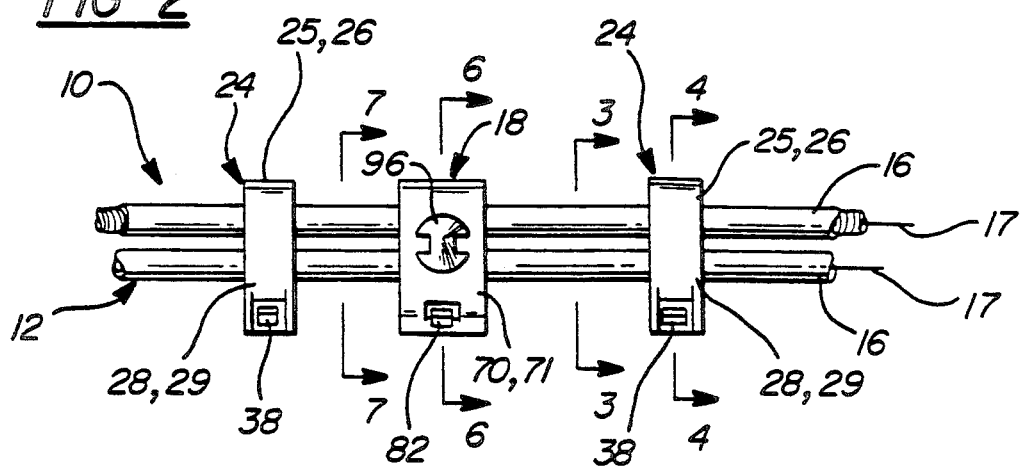
FIG. 2 is a front view of the assembly of FIG. 1.
Figure 3:
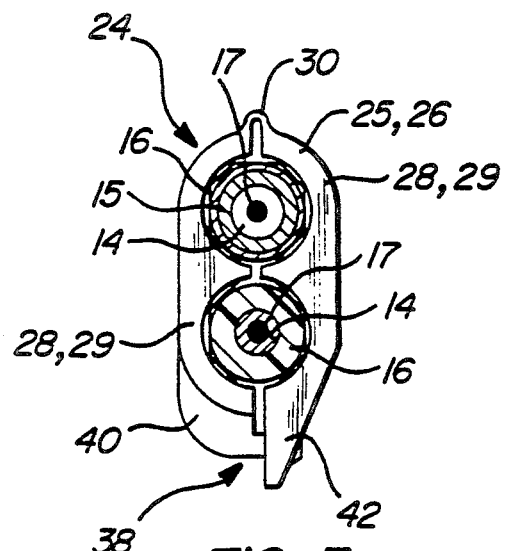
FIG. 3 is a cross-sectional view taken substantially along line 3—3 of FIG. 2.
Figure 4:
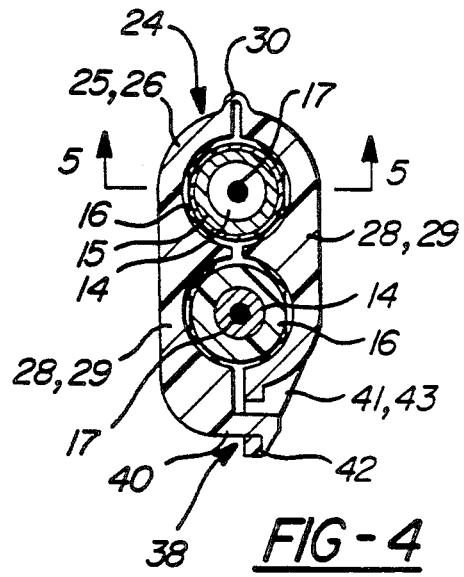
FIG. 4 is a cross-sectional view taken substantially along line 4—4 of FIG. 2.
Figure 6:
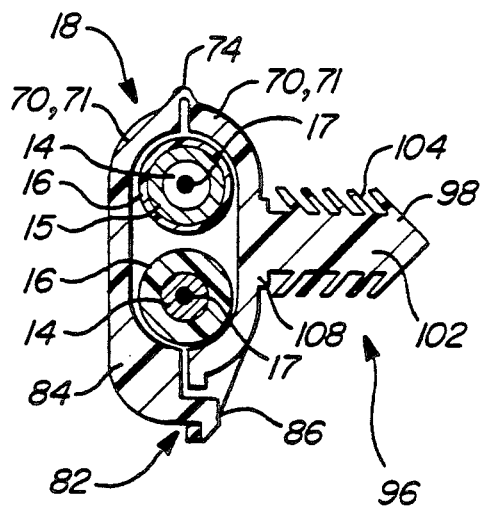
FIG. 6 is a cross-sectional view taken substantially along line 6—6 of FIG. 2.
Figure 7:
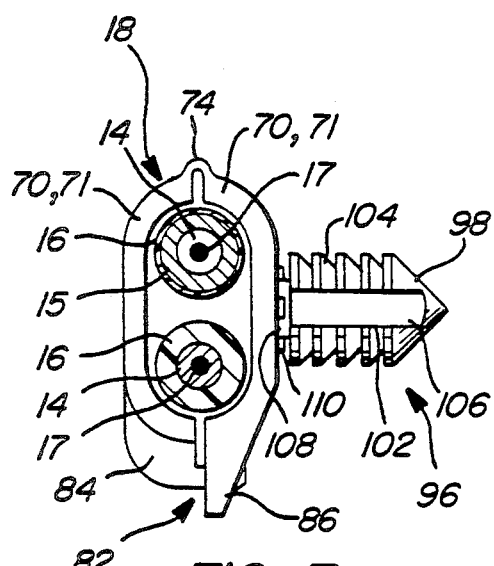
FIG. 7 is a cross-sectional view taken substantially along line 7—7 of FIG. 2.
Figure 8:
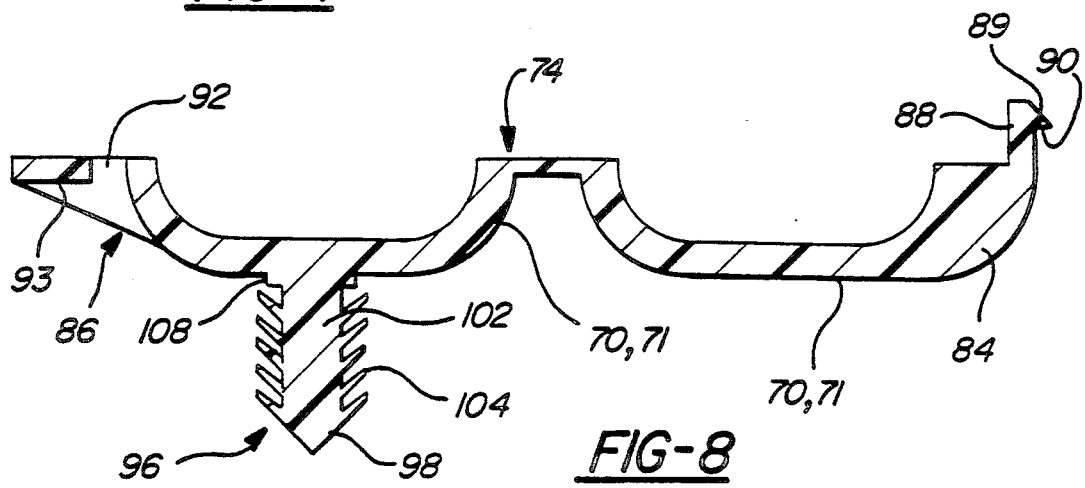
FIG. 8 is a cross-sectional view taken substantially along line 6—6 of FIG. 2 in an open position.

As shown in FIGS. 1 and 2, the connecting means 18 is coupled about the pair of conduits 12. The conduit means 12 is freely rotatable within the connecting means 18 and the connecting means 18 is freely slideable along the axial length of the conduit means 12. The connecting means 18 is generally fabricated of a rigid organic polymeric material. Referring to FIGS. 6-10, the connecting means 18 comprises a pair of conduit supporting members 70, 71. The connecting means 18 also comprises hinge means 74 hinging the conduit supporting members 70, 71 together for movement of the conduit supporting members 70, 71 relative to each other into a conduit supporting position with the conduit means 12 supported therebetween. Similar to the hinge means 30 of the limiting means 24, the hinge means 74 comprises a membranous member 76 interconnecting the conduit supporting members 70, 71 for relative movement therebetween. Likewise, the hinge means 74 is molded forming a bell shaped portion 78 with a flat face 79 and forming a central crease 80 upon closing the conduit supporting members 70, 71 together. As shown in FIGS. 6-8, the connecting means 18 including a latch means 82 for latching the conduit supporting members 70, 71 together and for maintaining the members 70, 71 in the conduit supporting position about the conduit means 12. Also similar to the latch means 38 of the limiting means 24, the latch means 82 comprises a spring finger 84 extending from one of the conduit supporting members 70, 71 and a catch 86 disposed on the other conduit supporting member 70, 71 for cooperating with the spring finger 84 to latch the conduit supporting members 70, 71 and having a camming surface 89 and lip 90 thereon. The catch 86 includes an aperture 92, generally rectangular in shape, having a back wall 93. In latching, the conduit supporting members 70, 71 are coupled about the conduit means 12 until the spring finger 81 is received in the catch 86. The camming surface 89 guides the arm 88 through the aperture 92 until the lip 90 engages and abuts with the back wall 93 and interlocks the members 70, 71 together. The spring finger 84 may also be flexed inwardly to release the lip 90 from abutment with the back wall 93 and disengage the latch means 82.

Figure 9:
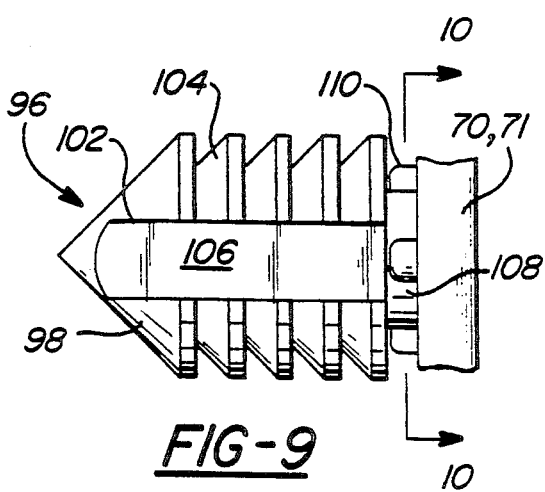
FIG. 9 is an enlarged fragmentary view of the fastening means of in FIG. 7.

The connecting means 18 further includes fastening means 96 for fastening the connecting means 18 to the support structure 20. As shown in FIGS. 9 and 10, the fastening means 96 includes an integral push-in retaining element 98 extending from one of the conduit supporting members 70, 71 for nonremovable disposition into an aperture 100 of the support structure 20 or connecting site 22. The push-in retaining element 98 comprises a shank 102 having a plurality of generally conically shaped flexible formations 104 extending radially therefrom. The conical shaped flexible formations 104 are interrupted on opposite sides of the shank 102 by a channel 106. The channel 106 provides separation in the formations 104 to enable relatively easy deformation of the flexible formation 104 for insertion of the retaining element 98 into the aperture 100 of the support structure 20 and yet relatively difficult removal of the retaining element 98 from the aperture 100. The retaining element 98 further includes a base portion 108 formed by a plurality of outwardly extending lugs 110 for abutment with the aperture 100 of the support structure 20.

In operation, prior to connection of the assembly 10 to the support structure 20, the limiting means 24 defined by stop blocks 25, 26 are positioned at predetermined locations along the length of the conduit means 12. The stop blocks 25, 26 are positioned along the conduit means 12 in a position spaced a predetermined distance on opposite sides of the connecting cite 22 of the support structure 20. The stop blocks 25, 26 are pivoted about the conduit means 12 by the hinge means 30 and latched together by connecting the latch means 38. The connecting means 18 is then positioned about the conduit means 12 at a position between the stop blocks 25, 26, and further pivoted about the conduit means 12 and latched together by connecting the latch means 82. As previously stated, the connecting means 18 is free to slide along the length of the conduit means 12 between the stop blocks 25, 26, and thus allows for alignment with the connecting site 22 of the support structure 20. The ends of the core element 17 are then connected to the respective actuator and controller corresponding with the motion transmitting remote control assembly 10. The final connection consist of pressing the fasteninq means 96 of the connecting means 18 into the aperture 100 of the support structure 20 which secures the conduit means 12 to the support structure 20.

DETAILED DESCRIPTION OF THE ALTERNATIVE EMBODIMENTS OF FIGS. 18-22

A second embodiment of the present invention is shown in FIGS. 18-20. Referring to the Figures, wherein like numerals indicate like or corresponding parts with an additional primed denotation, the motion transmitting remote control assembly 10' is adapted to be used with a single conduit means 12' of either type as previously described and shown in FIG. 1. The assembly 10' includes a conduit means 12' having opposite ends to be connected to its respective actuator and controller. Connecting means 18' is slideably connected about the conduit means 12' and includes conduit supporting members 70', 71' which are connected by a membranous hinge means 74'. The conduit supporting members 70', 71' are extended around the single conduit means 12' and latched together by latching means 82' having a spring finger 84' received in a catch 86'.

The connecting means 18' further includes fastening means 96' for alignment with a connecting site 22' of a support structure 20'. The fastening means 96' includes a push-in retaining element 98' which is received in an aperture 100' in a support structure 20' to fixedly secure the connecting means 18' to the support structure 20'. Spaced adjacent to and on opposite sides of the connecting means 18' are limiting means 24' further defined by stop blocks 25', 26'. The stop blocks 25', 26' include conduit engaging members 28', 29' interconnected by membranous hinge means 30'. The stop blocks 25', 26' are extended about the conduit means 12' at predetermined positions along the length of the conduit means 12' and latched thereto by latching means 38'. The latch means 38' includes a spring finger 40' which is received in a catch 42' to fixedly latch the conduit engaging member 28', 29' together. The limiting means 24' further includes gripping means 54' further defined by peaked projections 56' arranged in a helical or angle configuration about the inner surface 58' of the conduit engaging members 28', 29'. The peaked projections 56' engage with the outer casing 16' of the conduit means 12' to secure the stop blocks 25', 26' about the conduit means 12'. It will further be appreciated that the assembly 10 may be adapted to connect with a plurality of conduit means in addition to those shown in the enclosed Figures.

Figure 21A:
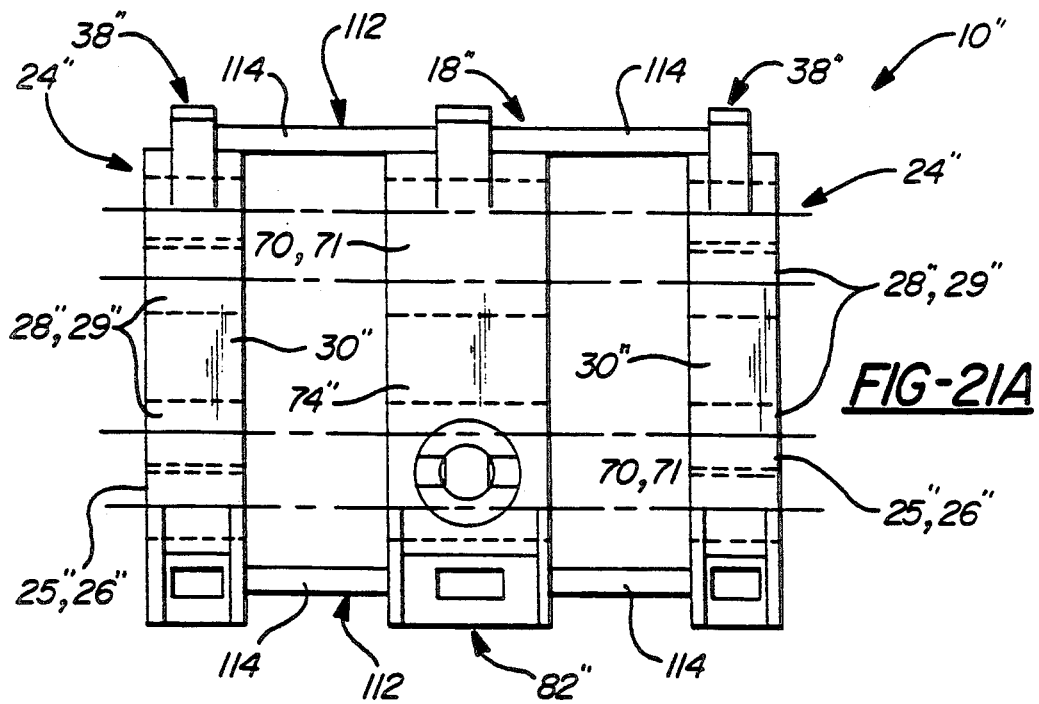
FIG. 21a is a front view of yet another embodiment of the present invention for use with a plurality of conduits and including spacer means.
Figure 21B:
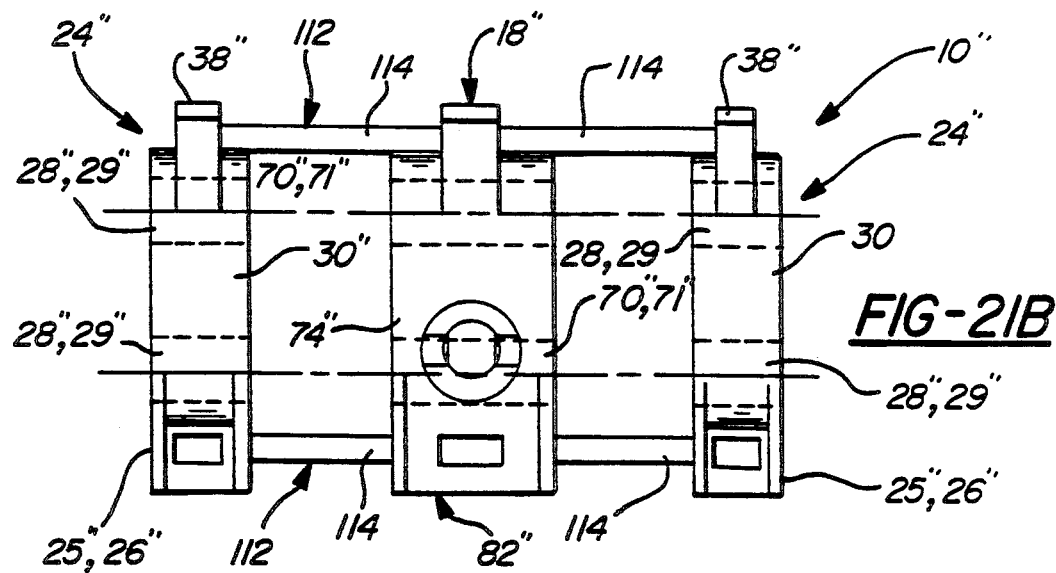
FIG. 21b is a front view of yet another embodiment of the present invention for use with a single conduit and including spacer means.

A third embodiment of the present invention is shown in FIGS. 21a and 21b. Referring to the Figures, wherein like numerals indicate like or corresponding parts with an additional double primed denotation, a motion transmitting remote control assembly 10" is shown with the present invention adapted to be used with a plurality of conduit means 12", FIG. 21a, or with a single conduit means 12", FIG. 21b. The assembly 10 includes a connecting means 18" comprising conduit supporting members 70", 71" hinged together by hinge means 74" and connected about the conduit means 12" by latch means 82".

The assembly 10" further includes limiting means 24" further defined by stop blocks 25", 26" and including conduit engaging members 28", 29" hinged together by hinge means 30" and connected about the conduit means 12" by latch means 38". The assembly 10" additionally includes spacer means 112 interconnecting the connecting means 18,, and the limiting means 24" for spacing the limiting means 24" a predetermined distance apart and for locating the connecting means 18" between the limiting means 24". The spacer means 112 comprises stringers 114 fabricated from an organic polymeric material. The stringers 114 are formed integrally with and extend between the connecting means 18" and the limiting means 24". The stringers 114 extend from each of the conduit supporting members 70", 71" of the connecting means 18" to each of the conduit engaging members 28", 29" of the limiting means 24" on opposite sides of the connecting means 18". The spacer means 112 allows the connecting means 18" and limiting means 24" to be attached to the conduit means as an integral unit. Once the unit 18", 24" is attached to the conduit means 12", the spacer means 112 can be detached from the connecting means 18" and limiting means 24" to allow rotation and/or slideable orientation of the connecting means 18" with the connecting site (not shown) between the limiting means 24".

Figure 22:
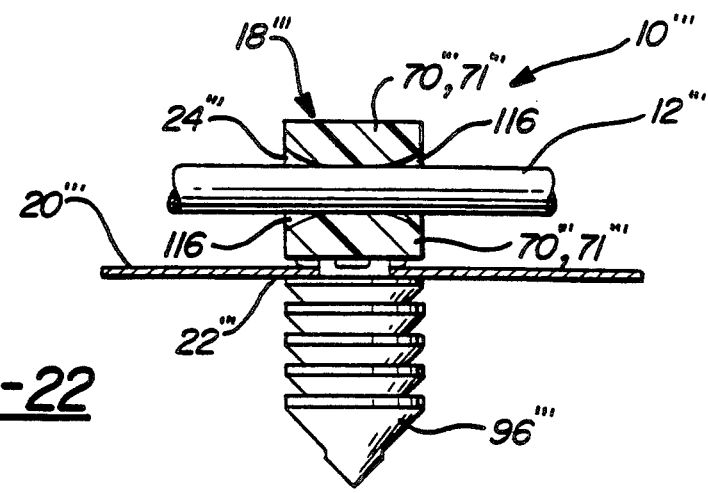
FIG. 22 is a partially cross-sectioned side view of yet another embodiment of the present invention for use with a conduit means in a curved path when in connection with a support structure.

A fourth embodiment of the present invention is shown in FIG. 22. Referring to the FIG., wherein like numerals indicate like or corresponding parts with an additional triple primed denotation, the assembly 10''' is shown including conduit means 12'''. A connecting means 18''' is slideably coupled about the conduit 12'''. The connecting means 18''' includes conduit supporting members 70''', 71''' interconnected by hinge means 74''' and connected together by latch means (not shown). The connecting means 18''' is secured at a connecting site 22''' to a support structure 20''' by a fastening means 96''' as previously described above. Limiting means (not shown) defined by stop blocks are spaced adjacent and on opposite sides of the connecting means 18''' as previously herein described to limit the travel of the connecting means 18''' along the conduit means 12'''. Additional to the fourth embodiment of FIG. 20 is an arcuate inner surface 116 of the conduit supporting members 70''', 71''' of the connecting means 18'''. As shown, the inner surfaces 116 of the conduit supporting members 70''', 71''' are arcuate in shape, the peak of the arc being the closest point to the conduit means 12'''. Thus, when the connecting means 18''' is secured to the support structure 20''', should the need for a bend in the conduit means 12''' be desired, the contour of the inner surface 116 of the conduit supporting members 70''', 71''' allows for bending of the conduit means 12''' about the connecting means 18''' and prevents kinking or creasing of the conduit means 12'''. Such a crease or abrupt change in direction of the conduit means 12''' would change the length of the inner core element 17''' within the conduit means 12''' of the motion transmitting assembly 10'''.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A motion transmitting remote control assembly (10) of the type for transmitting motion in a curved path by a motion transmitting core element, said assembly comprising:

conduit means (12) for establishing a path;

a core element (17) moveably guided by said conduit (12) for transmitting motions in said path, connecting means (18) slideably coupled to said conduit (12) for axial movement of said connecting means (18) along said conduit (12) and for connecting said conduit (12) to a support structure (20);

characterized by including limiting means (24) fixedly disposed on said conduit (12) in axially spaced positions on opposite sides of said connecting means (18) for limiting said axial movement of said connecting means (18) along said conduit (12).

2. An assembly as set forth in claim 1 wherein said conduit means (12) extends between opposite ends thereof, further characterized by said conduit means (12) including at least one connecting site (22) associated with said connecting means (18) located intermediate said ends of said conduit means (12).

3. An assembly as set forth in claim 2 further characterized by said limiting means (24) comprising stop blocks (25, 26) disposed on said conduit means (12) adjacent to and on opposite sides of said connecting site (22) for locating and limiting said axial movement of said connecting means (18) substantially near said connecting site (22).

4. An assembly as set forth in claim 3 further characterized by each of said stop blocks (25, 26) comprising a pair of conduit engaging members (28, 29).

5. An assembly as set forth in claim 4 further characterized by said stop blocks (25, 26) including hinge means (30) hinging said conduit engaging members (28, 29) together for movement of said conduit engaging members (28, 29) relative to each other to engage said conduit means (12) therebetween.

6. An assembly as set forth in claim 5 further characterized by including latch means (38) latching said conduit engaging members (28, 29) together for maintaining said conduit engaging members (28, 29) in engagement with said conduit means (12).

7. An assembly as set forth in claim 6 further characterized by said conduit engaging members (28, 29) including gripping means (54) in engagement with said conduit means (12) to prevent relative axial movement between said conduit means (12) and said stop blocks (25, 26).

8. An assembly as set forth in claim 7 further characterized by said hinge means (30) comprising a membranous member (32) interconnecting said conduit engaging members (28, 29) to maintain said conduit engaging members (28, 29) together for movement relative to each other.

9. An assembly as set forth in claim 8 further characterized by said latch means (38) comprising a spring finger (40) extending from one of said conduit engagement members (28, 29) and a catch (42) disposed on the other of said conduit engaging members (28, 29) for cooperating with said spring finger (40) to latch said conduit engaging members (28, 29) together.

10. An assembly as set forth in claim 9 further characterized by said gripping means (54) comprising a plurality of peaked projections (56) extending from said conduit engaging members (28, 29) and engaging said conduit means (12).

11. An assembly as set forth in claim 10 further characterized by said peaked projections (56) being arranged helically about said conduit means (12).

12. An assembly as set forth in claim 11 further characterized by each of said peaked projections (56) being elongated to present a linear conduit gripping surface to said conduit means (12).

13. An assembly as set forth in claim 12 further characterized by said gripping means (56) including peaked projections (56) disposed helically about the inner surface of said conduit engaging members (28,29) and spaced axially from adjacent like peaked projections (56).

14. An assembly as set forth in claim 13 wherein said conduit means (12) includes an inner liner (14) wrapped by helically spaced apart coiled metallic ribbon (15) and said ribbon (15) covered by an outer casing (16), said assembly further characterized by said adjacent peaked projections (56) engaging said outer casing (16) to enable said peaked projections (56) to grip said conduit means (12) between adjacent spaced apart wrappings of coiled metallic ribbon (15).

15. An assembly as set forth in claim 14 further characterized by said conduit means (12) being freely rotatable within said connecting means (18).

16. An assembly as set forth in claim 15 further characterized by said connecting means (18) comprising a pair of conduit supporting members (70,71).

17. An assembly as set forth in claim 16 further characterized by including hinge means (74) hinging said conduit supporting members (70, 71) together for movement of said conduit supporting members (70, 71) relative to each other into a conduit supporting position with said conduit means (12) supported therebetween.

18. An assembly as set forth in claim 17 further characterized by including latch means (82) latching said conduit supporting members (70,71) together for maintaining said conduit supporting members (70, 71) in said conduit supporting position.

19. An assembly as set forth in claim 18 further by said connecting means (18) including fastening means (96) for fastening said connecting means (18) to the support structure (20).

20. An assembly as set forth in claim 19 further characterized by said hinge means (74) comprising a membraneous member (76) interconnecting said conduit supporting members (70, 71) to maintain said conduit supporting members (70, 71) together for movement relative to each other.

21. An assembly as set forth in claim 20 further characterized by said latch means (82) comprising a spring finger (84) extending from one of said conduit supporting members (70, 71) and a catch (86) disposed on the other of said conduit supporting members (70, 71) for cooperating with said spring finger (84) to latch said conduit supporting members (70, 71) together.

22. An assembly as set forth in claim 21 further characterized by said fastening means (96) comprising an integral push-in retaining element (98) extending from one of said conduit engaging members (70, 71) for non-removable disposition into an aperture (100) provided in the support structure (20).

23. An assembly as set forth in claim 22 further characterized by said push-in retaining element (98) comprising a shank (102) having a plurality of generally conically shaped flexible formations (104) extending radially therefrom to enable insertion of said retaining element (98) into the aperture (100) and prevent removal of said retaining element (98) from the aperture (100).

24. An assembly as set forth in claim 23 further characterized by including spacer means (112) interconnecting said connecting means (18") and said limiting means (24") in axially spaced positions on opposite sides of said connecting means (18") for locating said connecting means (18") between said limiting means (24").

25. An assembly as set forth in claim 24 further characterized by said spacer means (112) comprising a stringer (114) formed integrally with said connecting means (18") and said limiting means (24") and adapted to be detached from said connecting means (18") and said limiting means (24") once said connecting means (18) and said limiting means (24") are attached to said conduit means (12").

* * * * *